(12) United States Patent
Yasui et al.

(10) Patent No.: US 10,539,196 B2
(45) Date of Patent: Jan. 21, 2020

(54) SELECTABLE ONE-WAY CLUTCH (71) Applicant: TOYOTA JIDOSHA KABUSHIKI KAISHA, Toyota-shi, Aichi-ken (JP)

(72) Inventors: Hiroki Yasui, Susono (JP); Hiroyuki Shioiri, Yokohama (JP); Hiroyuki Shibata, Odawara (JP); Yuki Kurosaki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 287 days.

(21) Appl. No.: 15/466,251

(22) Filed: Mar. 22, 2017

(65) Prior Publication Data
US 2017/0276193 A1    Sep. 28, 2017

(30) Foreign Application Priority Data

Mar. 25, 2016 (JP) ................. 2016-062833

(51) Int. Cl.
| F16D 23/12 | (2006.01) |
| F16D 41/12 | (2006.01) |
| F16D 41/14 | (2006.01) |
| F16C 3/02 | (2006.01) |
| F16H 21/44 | (2006.01) |
| F16H 35/18 | (2006.01) |
| F16D 41/08 | (2006.01) |

(Continued)

(52) U.S. Cl.
CPC ............ F16D 23/12 (2013.01); F16C 3/02 (2013.01); F16D 25/00 (2013.01); F16D 27/00 (2013.01); F16H 21/44 (2013.01); F16C 2326/01 (2013.01); F16D 41/00 (2013.01); F16D 41/08 (2013.01)

(58) Field of Classification Search
CPC ........ F16D 23/12; F16D 41/125; F16D 41/14; F16D 27/00; F16D 25/00; F16D 28/00; F16D 41/08; F16D 41/00; F16C 3/02; F16C 2326/01; F16H 21/44; F16H 35/18
See application file for complete search history.

(56) References Cited

U.S. PATENT DOCUMENTS 7,824,292 B2    11/2010  Samie et al.
9,653,964 B2 *  5/2017   Nakamura ............. H02K 23/38
(Continued)

FOREIGN PATENT DOCUMENTS

| JP | 2016-121750 A | 7/2016 |
| WO | 2010/011478 A2 | 1/2010 |

*Primary Examiner* — Tinh T Dang
(74) *Attorney, Agent, or Firm* — Hunton Andrews Kurth LLP (57) ABSTRACT

A selectable one-way clutch includes: a shaft; an actuator configured to cause the shaft to perform a rectilinear motion in a shaft direction; and an arm including an operation portion configured to receive force in the shaft direction from the shaft. The shaft includes a first flange and a second flange. An engaged state and a released state the selectable one-way clutch are switched by an operation of the arm by the rectilinear motion of the shaft, in an assembled state of the shaft and the arm in which the operation portion is arranged between the first flange and the second flange. The first flange is provided with a cut portion in an outer peripheral edge of the first shaft. The shaft has a structure in which the first flange does not face the operation portion in the shaft direction by the cut portion of the first flange.

2 Claims, 9 Drawing Sheets (51) Int. Cl.
*F16D 25/00* (2006.01)
*F16D 27/00* (2006.01)
*F16D 41/00* (2006.01)

(56) References Cited

U.S. PATENT DOCUMENTS

| | | | |
|---|---|---|---|
| 9,702,419 B2 * | 7/2017 | Essenmacher | F16D 41/125 |
| 9,765,830 B2 * | 9/2017 | Shioiri | F16D 28/00 |
| 9,822,825 B2 * | 11/2017 | Essenmacher | F16D 27/14 |
| 9,896,177 B1 * | 2/2018 | Tuchscherer | F16H 63/304 |
| 10,018,232 B2 * | 7/2018 | Itagaki | F16D 23/12 |
| 10,066,682 B2 * | 9/2018 | Shioiri | F16D 23/12 |
| 10,215,278 B1 * | 2/2019 | Tuchscherer | F16H 63/04 |
| 2016/0186818 A1 | 6/2016 | Shioiri et al. | |
| 2016/0377126 A1 * | 12/2016 | Essenmacher | F16D 28/00 192/84.6 |
| 2018/0001881 A1 * | 1/2018 | Huang | B60T 13/745 |

\* cited by examiner

<ASSEMBLED STATE>

<AT REPLACEMENT OF PLUNGER>

SHAFT DIRECTION

SELECTABLE ONE-WAY CLUTCH

CROSS-REFERENCE TO RELATED APPLICATION(S)

The present application claims priority to and incorporates by reference the entire contents of Japanese Patent Application No. 2016-062833 filed in Japan on Mar. 25, 2016.

BACKGROUND

1. Technical Field

The disclosure relates to a selectable one-way clutch.

2. Related Art

Selectable one-way clutches are known as one type of one-way clutches (see International Publication Pamphlet No. WO 2010/011478 A). A selectable one-way clutch is switched to an engaged state in which a rotating direction of a rotation member is regulated to one direction by an actuator, and a released state in which the rotation member is rotatable in both directions.

By the way, when the actuator is replaced with other actuator, an assembled state of the selectable one-way clutch and the actuator needs to be cancelled. In the configuration described in International Publication Pamphlet No. WO 2010/011478 A, a case needs to be disassembled once to cancel the assembled state. Then, after the replacement of the actuator, the case is assembled again. This makes replacement work of the actuator complicated.

SUMMARY

In some embodiments, a selectable one-way clutch includes: a shaft; an actuator configured to cause the shaft to perform a rectilinear motion in a shaft direction; and an arm including an operation portion configured to receive force in the shaft direction from the shaft, the arm being configured to switch between an engaged state and a released state of the selectable one-way clutch. The shaft includes: one end protruding from an actuator main body of the actuator; a first flange; and a second flange. The first flange and the second flange are formed side by side in the shaft direction, and are configured to expand outward in a radial direction from the shaft, as portions coming in contact with the operation portion and causing the force in the shaft direction to act on the operation portion. The engaged state and the released state are switched by an operation of the arm by the rectilinear motion of the shaft, in an assembled state of the shaft and the arm in which the operation portion is arranged between the first flange and the second flange. The first flange is arranged closer to the one end than the second flange, and is provided with a cut portion in an outer peripheral edge of the first shaft. The shaft has a structure in which the first flange does not face the operation portion in the shaft direction by the cut portion of the first flange.

The above and other objects, features, advantages and technical and industrial significance of this disclosure will be better understood by reading the following detailed description of presently preferred embodiments of the disclosure, when considered in connection with the accompanying drawings.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, a selectable one-way clutch in an embodiment of the disclosure will be specifically described with reference to the drawings.

1. Overall Structure

Figure 1:
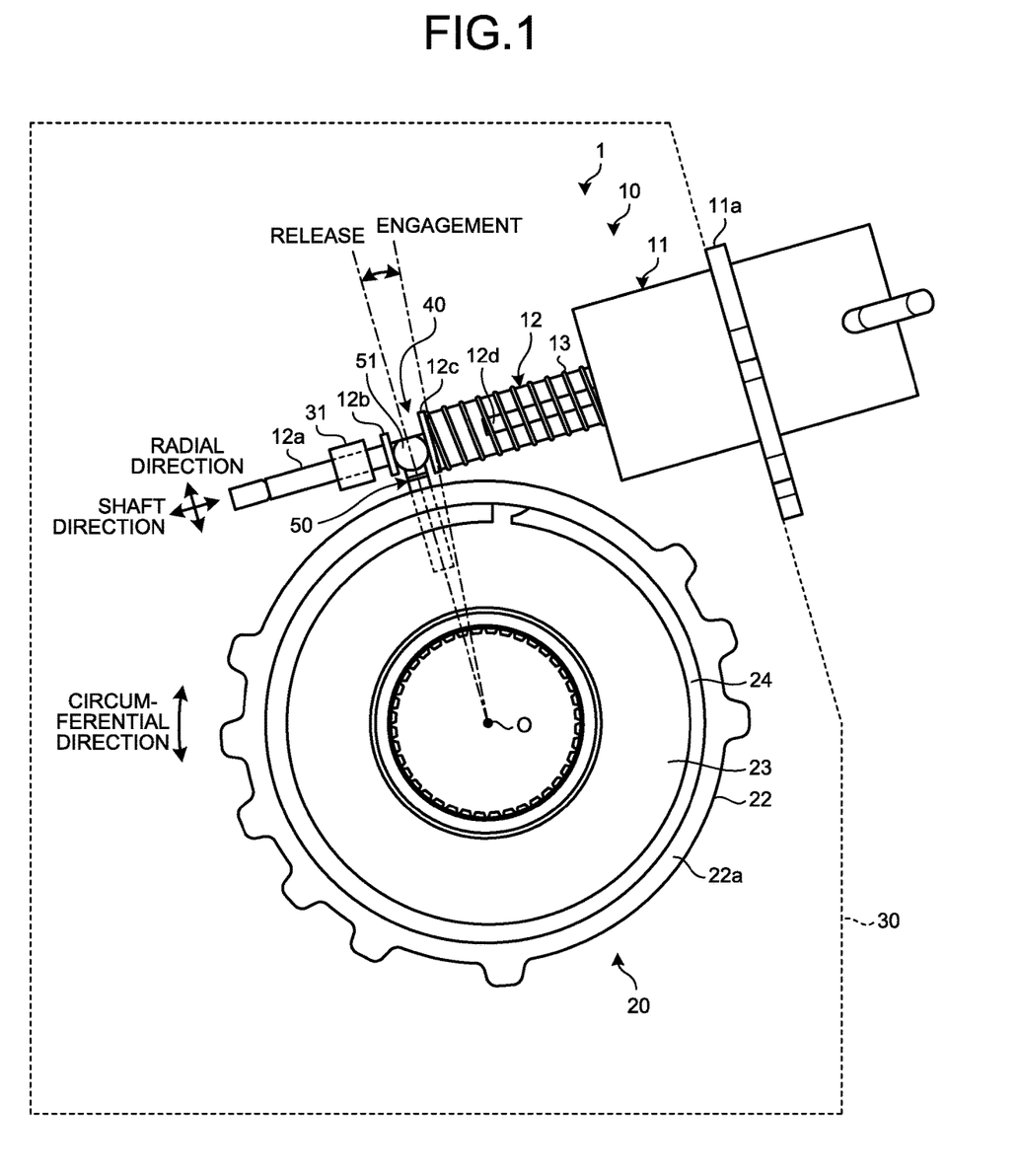
FIG. 1 is an external view illustrating an overall structure of a selectable one-way clutch in an embodiment.

FIG. 1 is an external view illustrating an overall structure of a selectable one-way clutch in an embodiment. A selectable one-way clutch (hereinafter, referred to as "SOWC") 1 has a structure in which an actuator 10 and a selectable one-way clutch main body (hereinafter, referred to as "SOWC main body") 20 are assembled. In the SOWC 1 in an assembled state, the actuator 10 and the SOWC main body 20 are connected through an arm 50 that constitutes an assembly portion 40 inside a case 30. Further, the SOWC 1 is switched between an engaged state in which a rotating direction of a rotation member (not illustrated) is regulated to one direction and a released state in which the rotation member is rotatable in both direction by an operation of the arm 50 in a peripheral direction of the SOWC main body 20 by the actuator 10.

The actuator 10 is a linear actuator that causes a plunger 12 to perform a rectilinear motion in a shaft direction, the plunger 12 having one end portion protruding from an actuator main body 11. The actuator main body 11 is a fixation member fixed to the case 30, and the plunger 12 is a movable member that reciprocates in the shaft direction.

The actuator main body 11 generate thrust (force in the shaft direction) to be provided to the plunger 12. The actuator main body 11 is formed into a columnar shape as a whole, and a portion to be attached 11a protruding from an outer peripheral portion of the actuator main body 11 is attached to the case 30. The portion to be attached 11a is provided near a central portion of the actuator main body 11 in a height direction (shaft direction) of the columnar shape. Therefore, when the actuator main body 11 is fixed to the case 30, a part of the actuator main body 11 exists outside the case 30. For example, the portion to be attached 11a is fastened to the case 30 with bolts. Further, the actuator 10 is an electromagnetic actuator, and a coil (not illustrated) is provided inside the actuator main body 11. The actuator main body 11 is electrically connected with a control device (not illustrated) and generates the thrust that moves the plunger 12 in the shaft direction when a current flows in the coil.

The plunger 12 is a shaft, and includes a shaft portion 12a protruding from the actuator main body 11, and a pair of flanges 12b and 12c expanding in a radial direction from the shaft portion 12a. A tip end (one end) of the shaft portion 12a is supported by a support member 31 provided in the case 30. A through hole is formed in the support member 31. The plunger 12 reciprocates in the shaft direction in a state where the one end of the shaft portion 12a penetrates the through hole and a state in which another end of the shaft portion 12a is provided inside the actuator main body 11.

Note that, in this description, simple description of "shaft direction" and "radial direction" means "the shaft direction of the plunger 12" and "the radial direction of the plunger 12".

The flange 12b and the flange 12c are a first flange 12b and a second flange 12c, respectively. The first flange 12b and the second flange 12c are formed side by side from the tip end (protruding portion) of the shaft portion 12a toward the actuator main body 11 in the shaft direction in this order. The first flange 12b is arranged on an opposite side of the actuator main body 11 with respect to the second flange 12c in the shaft direction. Further, a return spring 13 that causes biasing force in a releasing direction (force in the shaft direction) to act on the second flange 12c is provided between the second flange 12c and the actuator main body 11.

Further, the first flange 12b and the second flange 12c constitute the assembly portion 40, and are portions that cause the force of the plunger 12 in the shaft direction to act on the arm 50. The arm 50 is made of a thin and long member, and one end of the arm 50 constitutes an operation portion 51 that receives the force in the shaft direction from the plunger 12. The operation portion 51 is arranged between the first flange 12b and the second flange 12c. As illustrated by the broken lines in FIG. 1, the other end of the arm 50 is provided inside the SOWC main body 20 formed into an approximately annular shape, and is connected to be integrally operated with a selector plate 21 (illustrated in FIG. 3A) in the peripheral direction. The arm 50 is a member attached to the SOWC main body 20, and protrudes outward in a radial direction of the SOWC main body 20.

In the SOWC main body 20, a pocket plate 22 (first clutch member) has a cylinder 22a, and a notch plate 23 (second clutch member) is provided on an inner peripheral side of the cylinder 22a. The notch plate 23 does not come off the pocket plate 22 by a snap ring 24 attached to an inner peripheral portion of the cylinder 22a. As illustrated by the broken lines in FIG. 1, the arm 50 penetrates the cylinder 22a of the pocket plate 22, and the other end is positioned inside the SOWC main body 20. The arm 50 is arranged such that the other end faces a center O of the SOWC main body 20, and a longitudinal direction of the arm 50 goes along the radial direction of the SOWC main body 20. Further, when the plunger 12 reciprocates in the shaft direction, the operation portion 51 of the arm 50 reciprocates in the peripheral direction between a released position and an engaged position, as illustrated by the long dashed and short dashed lines in FIG. 1. That is, in the assembly portion 40, the force (thrust) of the plunger 12 in the shaft direction is changed into force (rotating force) in a rotating direction by the arm 50, and the force in the rotating direction acts on the selector plate 21 of the SOWC main body 20 from the arm 50.

2. Assembly Portion

Figure 2:
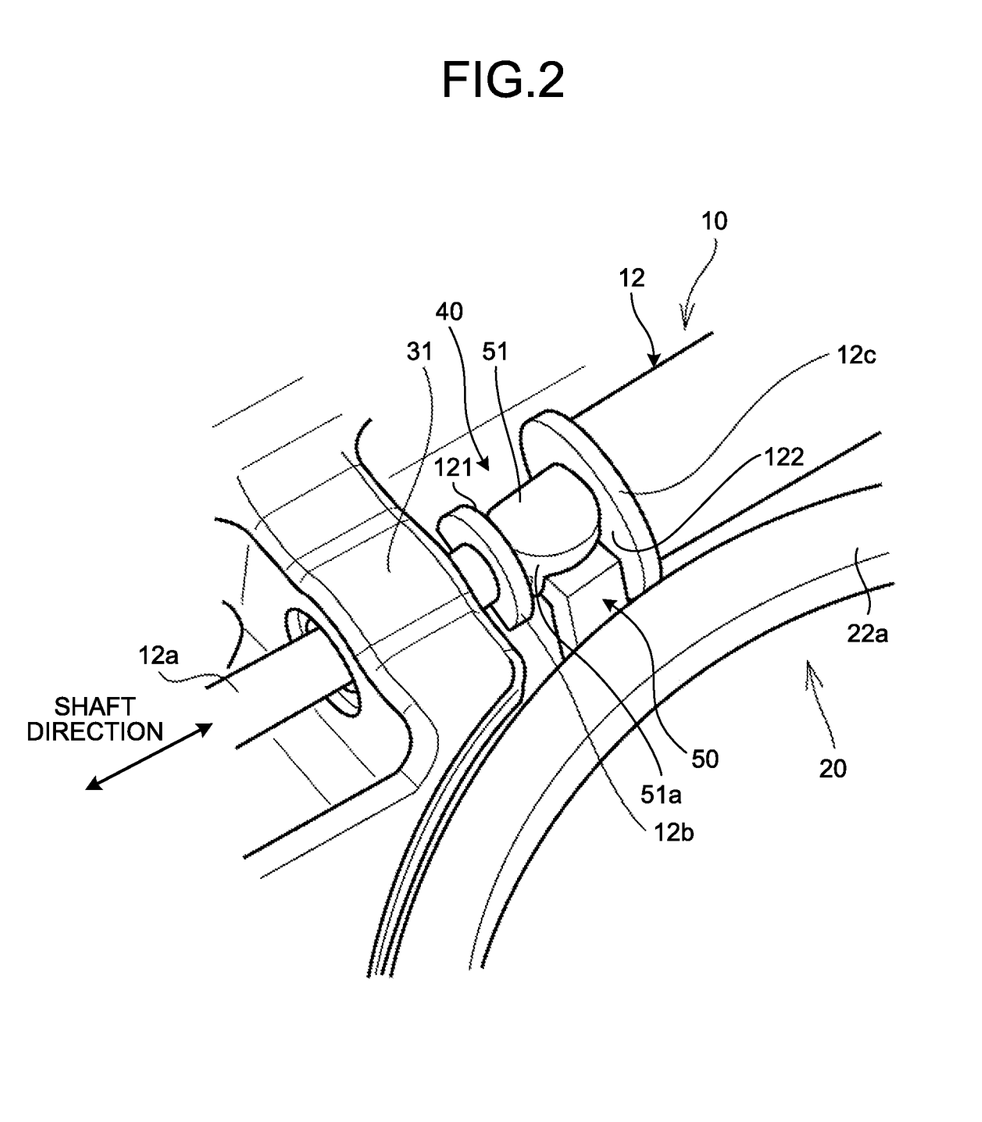
FIG. 2 is a diagram for describing an assembly portion of an actuator and a selectable one-way clutch main body.

FIG. 2 is a diagram for describing the assembly portion 40 of the actuator 10 and the SOWC main body 20. In the assembly portion 40, the plunger 12 of the actuator 10 is connected with the SOWC main body 20 through the arm 50. The force of the plunger 12 moving in the shaft direction acts on the operation portion 51 of the arm 50 in the assembly portion 40.

In the operation portion 51, a surface (hereinafter, referred to as "operation surface") 51a that receives the force in the shaft direction from the plunger 12 is formed into a curved surface. The SOWC 1 includes a first wall surface 121 of the first flange 12b and a second wall surface 122 of the second flange 12c. The first wall surface 121 and the second wall surface 122 are served as surfaces coming in contact with the operation surface 51a and causing the force in the shaft direction to act on the arm 50 from the plunger 12. The wall surfaces 121 and 122 are flat surfaces expanding on a plane perpendicular to the shaft direction, and face each other in the shaft direction. The first wall surface 121 is a surface facing the second flange 12c side (engaging direction side) in the shaft direction, and the second wall surface 122 is a surface facing the first flange 12b side (releasing direction side) in the shaft direction. In the assembly portion 40 being in the assembled state, the first wall surface 121 and the operation surface 51a face each other in the shaft direction, and the second wall surface 122 and the operation surface 51a face each other in the shaft direction. Accordingly, when the plunger 12 is moved in the shaft direction, the arm 50 is operated such that the curved operation surface 51a rolls on the wall surfaces 121 and 122. That is, the first wall surface 121 and the operation surface 51a are in line contact. Similarly, the second wall surface 122 and the operation surface 51a are in line contact.

Figure 3A:
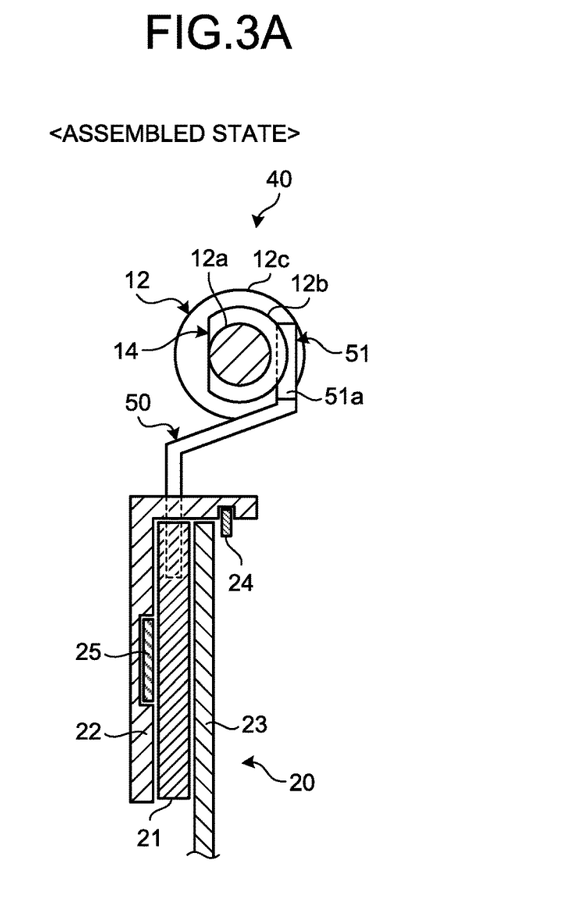
FIG. 3A is a schematic view illustrating a case in which the assembly portion in an assembled state is viewed from a shaft direction of a plunger.

FIG. 3A is a schematic view illustrating a state in which the assembly portion 40 being in the assembled state is viewed from the shaft direction of the plunger 12. In a case where the assembly portion 40 is in the assembled state, the first flange 12b and the operation portion 51 overlap, as viewed from the shaft direction, as illustrated by the broken line in the first flange 12b in FIG. 3A. That is, the assembled state is a state in which the first flange 12b, the operation portion 51, and the second flange 12c overlap when the assembly portion 40 is viewed from the shaft direction. Accordingly, the force of the plunger 12 in the shaft direction (thrust in the engaging direction) acts on the operation portion 51 from the first flange 12b. Further, the force of the plunger 12 in the shaft direction (thrust in the releasing direction) acts on the operation portion 51 from the second flange 12c.

Further, the first flange 12b is provided with a cut portion 14. The cut portion 14 is a portion obtained by cutting a part of an edge to remove the part (a portion including the edge)

of the first flange 12*b* having an annular shape. The annular flange is a flange having an arc outer peripheral edge that continues to go around an outer periphery of the shaft portion 12*a*. Further, the cut portion 14 has a structure that cancels the assembled state of the assembly portion 40, and is provided in a position shifted from the operation portion 51 as viewed from the shaft direction of the plunger 12, in the case of the assembled state illustrated in FIG. 3A.

In the example illustrated in FIG. 3A, the cut portion 14 linearly cuts the first flange 12*b* along a tangential line of an outer peripheral circle of the shaft portion 12*a*. That is, the first flange 12*b* has an outer peripheral edge partially including a linear edge and including an arc edge in the remaining portion. In the first flange 12*b*, the first wall surface 121 having the same height outward in the radial direction is not formed throughout the entire periphery of the outer peripheral circle of the shaft portion 12*a*. With the linear cut portion 14 in this way, a part of the first flange 12*b* can be easily cut.

As illustrated in FIG. 3A, the one end of the arm 50, which is arranged outside the SOWC main body 20, is formed into a bent shape, and the other end of the arm 50 is arranged inside the SOWC main body 20. The selector plate 21 connected to the arm 50 is a member that selectively switches the SOWC 1 to the engaged state and the released state. The selector plate 21 is arranged between the pocket plate 22 and the notch plate 23. The SOWC main body 20 is switched between the engaged state in which the pocket plate 22 regulates the rotating direction of the notch plate 23 to one direction, and the released state in which the pocket plate 22 is rotatable in both directions. When the plunger 12 is moved in the shaft direction, the arm 50 is operated and the selector plate 21 is moved (rotated) in the peripheral direction in the SOWC main body 20. The engaged state and the released state of the SOWC 1 are switched when the selector plate 21 is rotated in the peripheral direction by a predetermined angle by the actuator 10. A plurality of strut through holes (not illustrated) is formed in positions at predetermined intervals in the peripheral direction in the selector plate 21. In the selector plate 21, a plate portion between the strut through holes in the peripheral direction functions as a structure for retracting a strut 25 to the pocket plate 22 side. A released state (accommodated state) in which the strut 25 is accommodated in a pocket (accommodation recess) of the pocket plate 22, and an engaged state (standing state) in which the strut 25 rises to the notch plate 23 and is engaged with an engagement recess provided in the notch plate 23 are switched according to the position of the selector plate 21 in the peripheral direction.

Figure 3B:
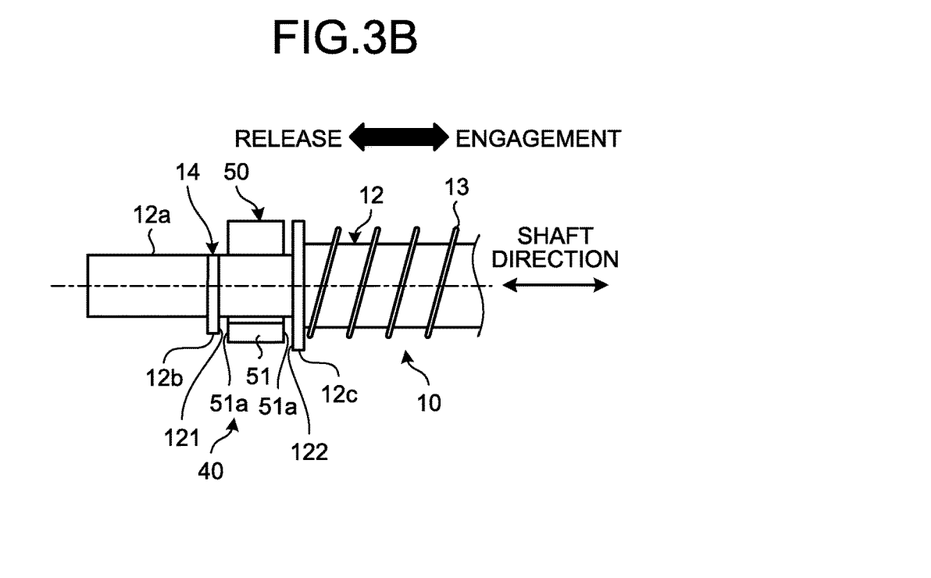
FIG. 3B is a schematic view illustrating a case in which the assembly portion in the assembled state is viewed from a radial direction of the plunger.

FIG. 3B is a schematic view illustrating a case in which the assembly portion 40 being in the assembled state is viewed from the radial direction of the plunger 12. The first wall surface 121 of the first flange 12*b* and the operation surface 51*a* of the operation portion 51 face each other in the shaft direction. Since the operation portion 51 is sandwiched by the flanges 12*b* and 12*c* in the shaft direction, the operation portion 51 can come in contact with both of the flanges 12*b* and 12*c* in the shaft direction. Accordingly, when the plunger 12 is moved in the shaft direction (engaging direction) against the biasing force of the return spring 13, the force in the shaft direction (engaging direction) acts on the operation portion 51 from the first flange 12*b*. On the other hand, when the plunger 12 is moved in the shaft direction (releasing direction) by the biasing force of the return spring 13, the force in the shaft direction (releasing direction) acts on the operation portion 51 from the second flange 12*c*.

3. Rotation Prevention Structure

When the SOWC 1 is in the assembled state, the SOWC 1 has a structure in which the plunger 12 can be moved in the shaft direction with respect to the actuator main body 11, and has a structure (rotation prevention structure) in which the plunger 12 cannot be relatively rotated with respect to the actuator main body 11. The SOWC 1 is provided with the cut portion 14 in the first flange 12*b* that constitutes the assembly portion 40. If the first flange 12*b* is unintentionally rotated in the peripheral direction of the shaft portion 12*a*, and the portion (cut portion 14) where a part of the first flange 12*b* is removed overlaps with the operation portion 51, the operation portion 51 comes off the assembly portion 40. To prevent this, the SOWC 1 has the rotation prevention structure.

Figure 4A:
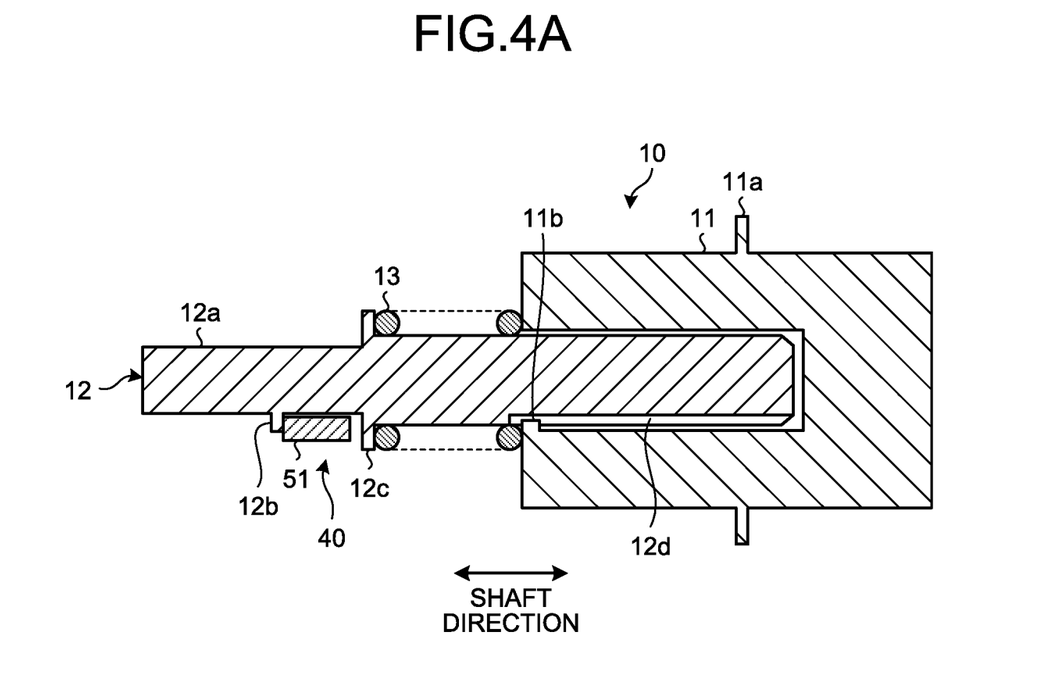
FIG. 4A is a sectional view illustrating a cross section of the actuator along the shaft direction.
Figure 4B:
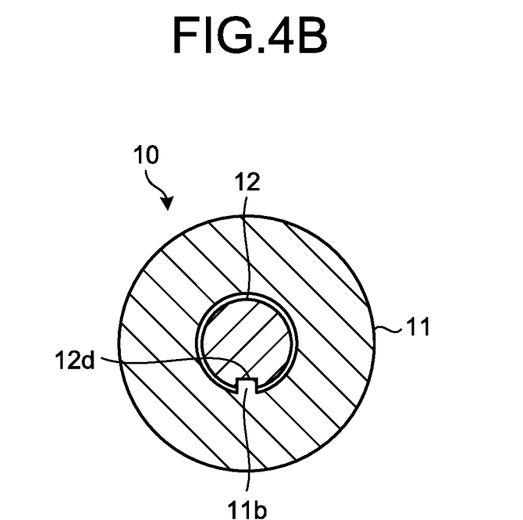
FIG. 4B is a sectional view illustrating a cross section of an actuator main body, the section being perpendicular to the shaft direction.

FIG. 4A is a sectional view illustrating a cross section of the actuator 10 along the shaft direction. FIG. 4B is a sectional view illustrating a cross section of the actuator main body 11, the cross section being perpendicular to the shaft direction. As illustrated in FIG. 4A, a key groove (groove) 12*d* is formed in the shaft portion 12*a* of the plunger 12 along the shaft direction. A key (protrusion) 11*b* that protrudes toward an inner peripheral side of the plunger 12 in the radial direction is formed in the actuator main body 11. Since the other end of the plunger 12 is inserted in the actuator main body 11 through an opening, the key 11*b* is provided to the opening. Since the actuator main body 11 is fixed to the case 30, the plunger 12 is prevented from being rotated in the peripheral direction of the shaft portion 12*a* in a state where the key 11*b* is fit in the key groove 12*d*, as illustrated in FIG. 4B. Accordingly, the plunger 12 can be prevented from being rotated in the peripheral direction of the shaft portion 12*a*, and the operation portion 51 can be prevented from coming off the assembly portion 40.

4. At Assembly

Figure 5:
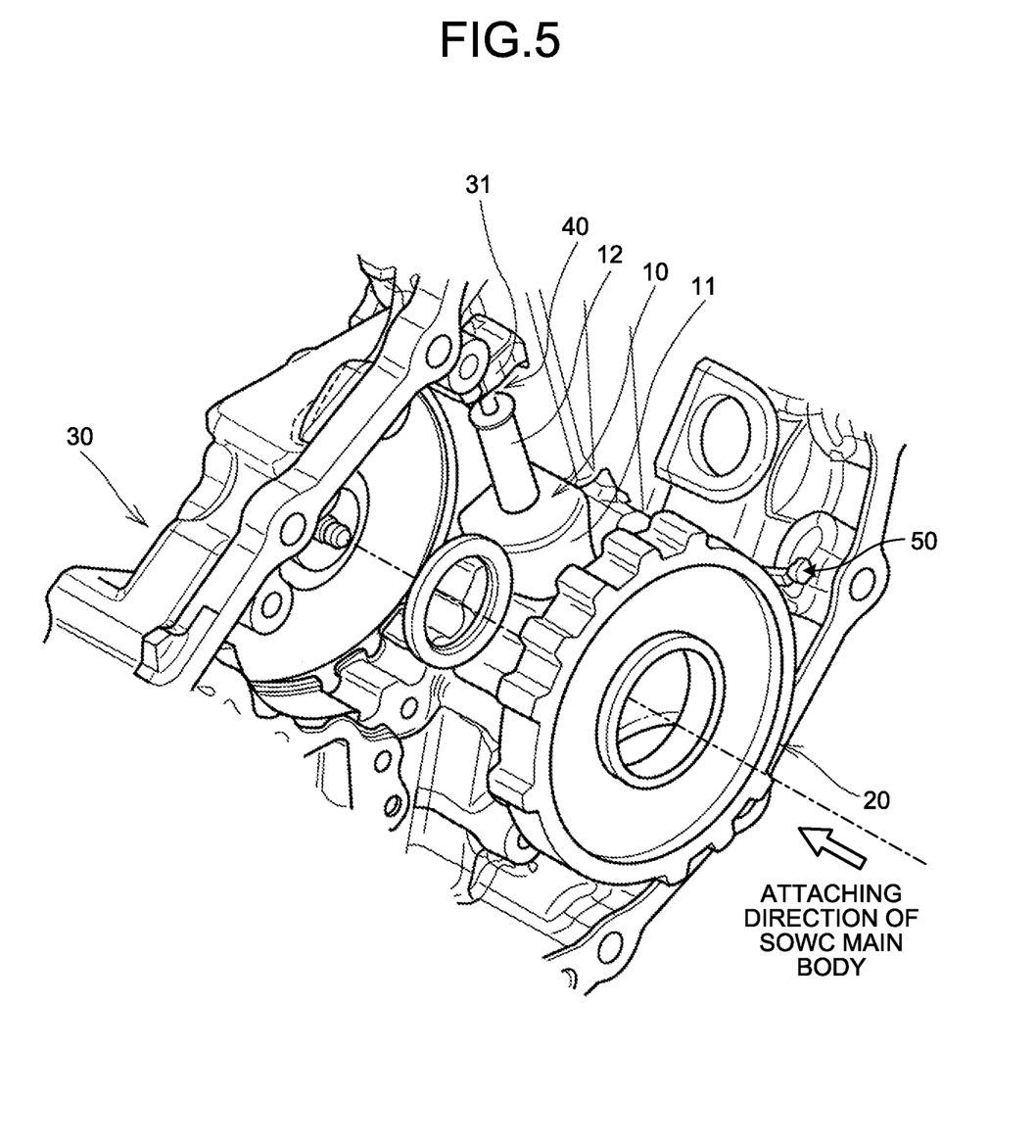
FIG. 5 is a diagram for describing a method of assembling the actuator and a selectable one-way clutch main body.

FIG. 5 is a diagram for describing a method of assembling the actuator 10 and the SOWC main body 20. In attaching the SOWC 1 to the case 30, first, the actuator 10 is attached to the case 30, and after that, the SOWC main body 20 is attached to the case 30. As illustrated in FIG. 5, the SOWC main body 20 to which the arm 50 is attached is attached to the case 30 and is assembled to the actuator 10 from an attaching direction illustrated by the white arrow to overlap with the portion where the actuator 10 is attached. That is, in assembling the actuator 10 and the SOWC main body 20, the arm 50 approaches the actuator 10 fixed to the case 30 from an outside in the radial direction of the plunger 12, and is assembled between the pair of flanges 12*b* and 12*c*. At that time, the pocket plate 22 is fit in the case 30. For example, in a case where the SOWC 1 is mounted on a vehicle, the case 30 is a case (rear cover) that accommodates a power transmission mechanism, and the notch plate 23 is connected to be integrally rotated with a rotation member that configures the power transmission mechanism of the vehicle.

5. At Replacement of Plunger

Here, replacement of the plunger is described. The SOWC 1 can cancel the assembled state of the assembly portion 40 without moving the SOWC main body 20 in a detaching direction. The actuator 10 can separate the actuator main body 11 and the plunger 12 in the shaft direction.

Figure 6:
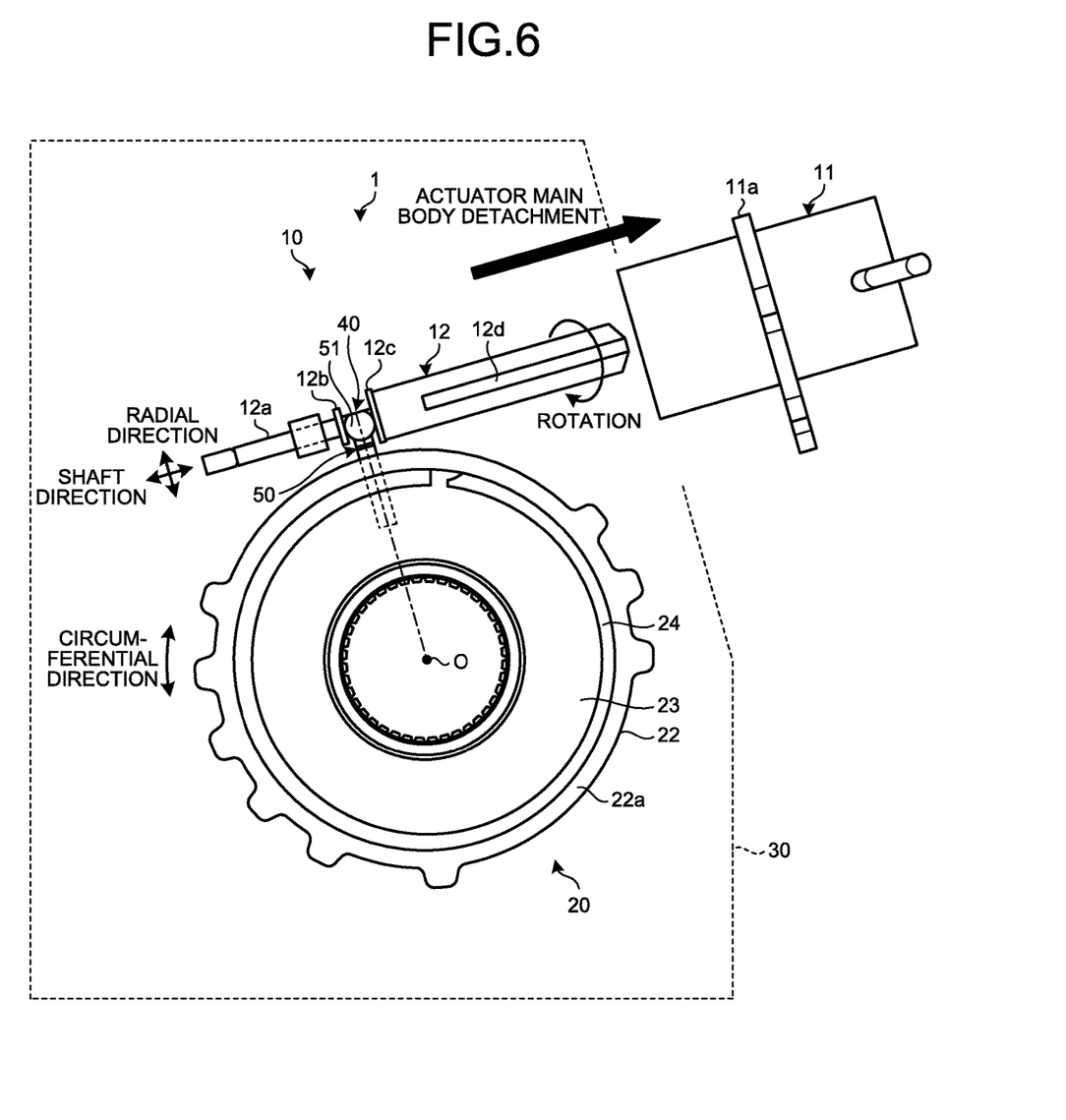
FIG. 6 is a diagram for describing a state in which the actuator main body and the plunger are separated.

First, a separation state of the actuator 10 will be described. FIG. 6 is a diagram for describing a state in which the actuator main body 11 and the plunger 12 are separated. The actuator main body 11 is detachable in the shaft direction of the plunger 12. Accordingly, the plunger 12 can be taken out of the actuator main body 11 in the shaft direction in the state where the plunger 12 and the arm 50 remain assembled in the assembly portion 40. In this separation state, the key 11b of the actuator main body 11 is unfastened from the key groove 12d of the plunger 12. Thus, the plunger 12 becomes rotatable in the peripheral direction of the shaft portion 12a while remaining in the assembled state. Then, as illustrated in FIG. 6, by rotation of the plunger 12, the assembled state in the assembly portion 40 can be cancelled.

Figure 7A:
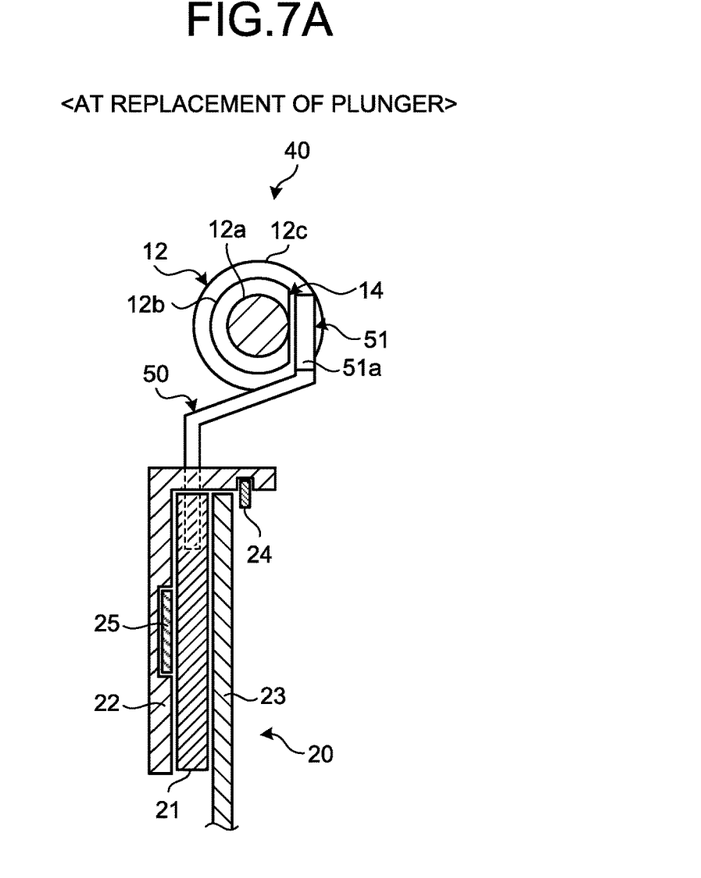
FIG. 7A is a schematic view illustrating a state in which the assembly portion in a cancelled state is viewed from the shaft direction of the plunger.
Figure 7B:
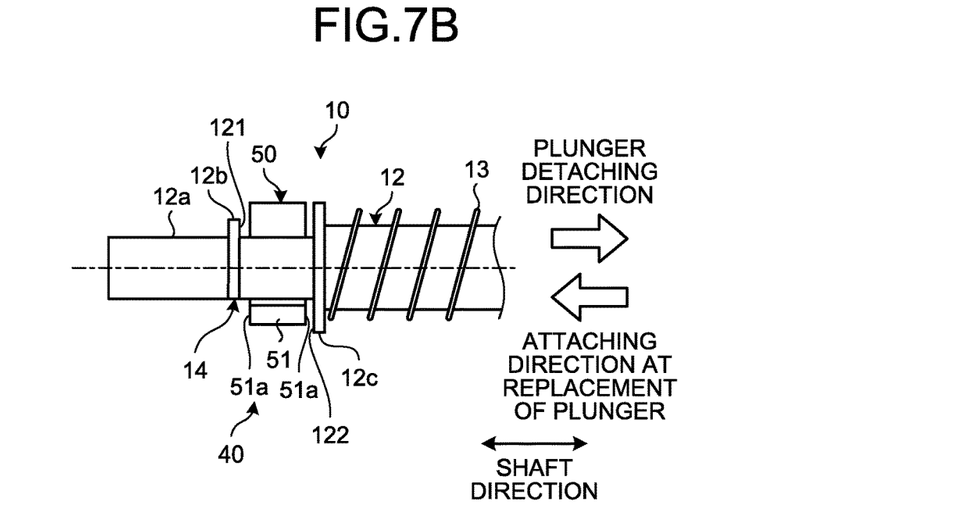
FIG. 7B is a schematic view illustrating a case in which the assembly portion in the cancelled state is viewed from the radial direction of the plunger.

Next, a cancelled state of the assembly portion 40 will be described. FIG. 7A is a schematic view illustrating a state in which the assembly portion 40 being in the cancelled state is viewed from the shaft direction of the plunger 12. FIG. 7B is a schematic view illustrating a state in which the assembly portion 40 being in the cancelled state is viewed from the radial direction of the plunger 12. Note that the cancelled state illustrated in FIG. 7A illustrates a state in which the plunger 12 in the state illustrated in FIG. 3A is rotated by 180°.

In a case where the assembly portion 40 is in the cancelled state as illustrated in FIG. 7A, the first flange 12b is provided in a position shifted from the operation portion 51, as viewed from the shaft direction. The portion of the first flange 12b, where a part of the first flange 12b is removed by the cut portion 14, overlaps with the operation portion 51. Further, the shape of the first flange 12b, which is removed by the cut portion 14, is larger than the portion overlapping with the operation portion 51 of the arm 50, as viewed from the shaft direction.

In a case where the assembly portion 40 is in the cancelled state as illustrated in FIG. 7B, the first flange 12b does not come in contact with the operation portion 51 when the plunger 12 is moved in the detaching direction (shaft direction). That is, the plunger 12 has a structure not to cause a load in the shaft direction to act on the operation portion 51 of the arm 50 in the position where the first flange 12b is provided in the shaft direction. In short, the plunger 12 has a structure in which the first flange 12b and the operation portion 51 do not face each other in the shaft direction by the cut portion 14 provided in the first flange 12b. When the plunger 12 and the arm 50 are relatively moved in the shaft direction, the first flange 12b does not regulate the movement. The plunger 12 is moved to the engagement side in the shaft direction in this way, whereby the operation portion 51 can be detached from the assembly portion 40 (between the pair of flanges 12b and 12c) in the shaft direction. Accordingly, the SOWC 1 can cause the assembly portion 40 to be in the cancelled state while keeping the SOWC main body 20 attached to the case 30.

To be specific, at the replacement of the plunger 12, the fastening of the actuator main body 11 and the case 30 with the bolts is cancelled from an outside of the case 30. Since the actuator main body 11 and the plunger 12 can be separated in the shaft direction, the actuator main body 11 can be taken out in the detaching direction from the outside of the case 30. At that time, the SOWC main body 20 remains accommodated inside the case 30. Further, a portion of the case 30 through which the actuator main body 11 is detached is open. Therefore, by rotating the plunger 12 by about 180° through the opening, the cut portion 14 and the first flange 12b come to the overlapping position as viewed from the shaft direction, and the assembly portion 40 is in the cancelled state. Accordingly, the plunger 12 can be taken out to the outside of the case 30 from the inside of the case 30 without disassembling the case 30. Then, a new plunger 12 may just be attached in a reverse order to the above-described detaching method.

As described above, according to the SOWC 1 of the present embodiment, the assembled state of the actuator 10 and the SOWC main body 20 can be cancelled while keeping the SOWC main body 20 attached to the case 30. Accordingly, the actuator 10 can be detached from the case 30 without disassembling the case 30.

Note that the disclosure is not limited to the above-described embodiment, and can be appropriately changed without departing from the objective of the disclosure.

For example, the shape of the cut portion 14 and the shape of the first flange 12b are not limited to the above-described embodiment. The cut portion 14 may be formed into a curved shape or a rectangular shape as viewed from the shaft direction. In short, the plunger 12 may just have a structure in which the first flange 12b does not overlap with the operation portion 51 as viewed from the shaft direction.

Figure 8A:
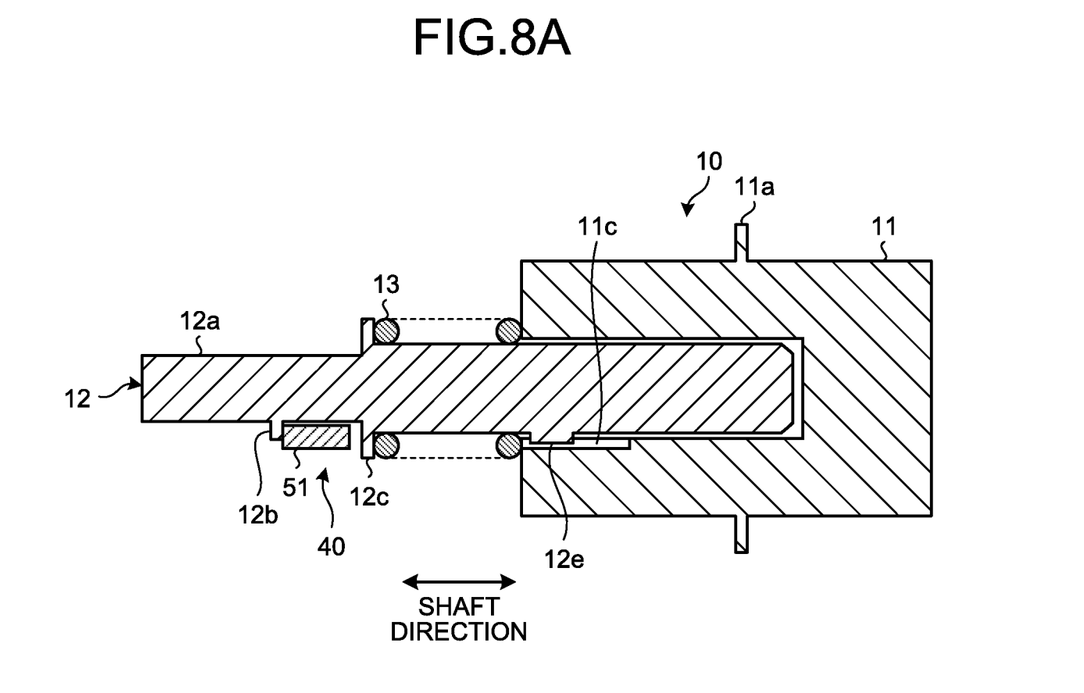
FIG. 8A is a sectional view illustrating a cross section of an actuator along a shaft direction in a modification.
Figure 8B:
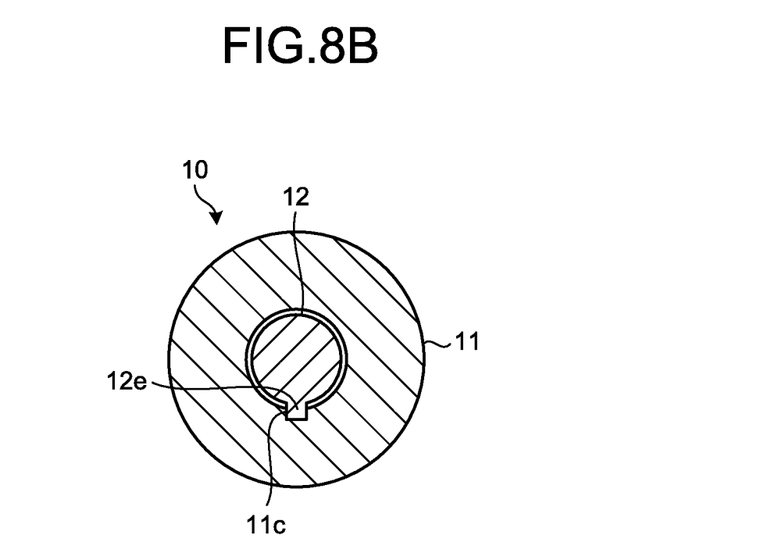
FIG. 8B is a sectional view illustrating a cross section of an actuator main body, the cross section being perpendicular to the shaft direction, in the modification.

Further, the key may just be provided in one of the plunger 12 and the actuator main body 11, and the key groove may just be provided in the other one of the plunger 12 and the actuator main body 11. FIG. 8A is a sectional view illustrating a cross section of an actuator 10 along a shaft direction in a modification. FIG. 8B is a sectional view illustrating a cross section of an actuator main body 11, the cross section being perpendicular to the shaft direction, in the modification. In the actuator 10 of the modification, a plunger 12 is provided with a key 12e, and the actuator main body 11 is provided with a key groove 11c. The key groove 11c is formed inside the actuator main body 11 along the shaft direction.

Figure 9:
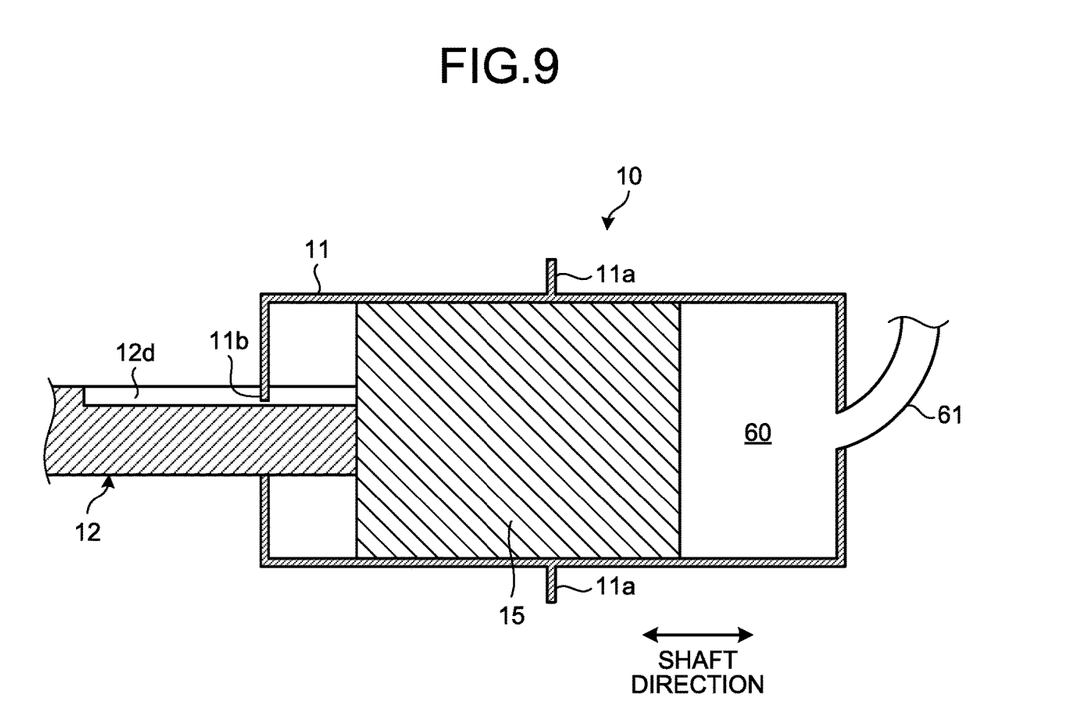
FIG. 9 is a sectional view illustrating a structure of a hydraulic actuator in a modification.

Further, the actuator 10 is not limited to the electromagnetic actuator and may be a hydraulic actuator. FIG. 9 is a sectional view illustrating a structure of a hydraulic actuator 10 in a modification. As illustrated in FIG. 9, in a case of the hydraulic actuator, a piston 15 reciprocates in a shaft direction by hydraulic pressure of a hydraulic chamber 60 formed in an actuator main body 11. Since a plunger 12 is formed in an integrated structure with the piston 15, the plunger 12 cannot be separated from the actuator main body 11 as a cylinder. Further, an oil is supplied to the hydraulic chamber 60 through an oil path 61, and the oil is discharged from the hydraulic chamber 60 to the oil path 61. Then, by cancelling fastening of a portion to be attached 11a of the actuator main body 11 and a case 30 with bolts, the entire actuator 10 becomes relatively movable with respect to an SOWC main body 20. Even if the plunger 12 and the actuator main body 11 cannot be separated like the present modification, the entire actuator 10 can be integrally rotated. Accordingly, like the cancelled state illustrated in FIG. 7A, a cut portion 14 can be rotated to a position overlapping with an operation portion 51 in an assembly portion 40. That is, even if the plunger 12 and the actuator main body 11 cannot be separated, the actuator 10 can be moved in a detaching direction while keeping the SOWC main body 20 attached to the case 30.

According to some embodiments, the shaft that performs a rectilinear motion has a structure in which the first flange does not face the operation portion in the shaft direction by the cut portion formed in the outer peripheral edge of the first flange. Accordingly, in a case where the first flange does not face the operation portion in the shaft direction, unlike the assembled state, the operation portion can be detached along the shaft direction from between the first flange and the second flange.

According to some embodiments, the actuator main body and the shaft cannot be relatively rotated. Therefore, unintended rotation of the shaft can be prevented in the assembled state. Accordingly, the first flange and the operation portion can be prevented from not facing in the shaft direction by mistake from the assembled state.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A selectable one-way clutch comprising:
    a shaft;
    an actuator configured to cause the shaft to perform a rectilinear motion in a shaft direction; and
    an arm including an operation portion configured to receive force in the shaft direction from the shaft, the arm being configured to switch between an engaged state and a released state of the selectable one-way clutch, wherein:
    the shaft includes:
        one end protruding from an actuator main body of the actuator;
        a first flange; and
        a second flange,
    the first flange and the second flange are formed side by side in the shaft direction, and extend outward in a radial direction from the shaft,
    the first flange and the second flange come in contact with the operation portion and cause the force in the shaft direction to act on the operation portion,
    the engaged state and the released state are switched by an operation of the arm by the rectilinear motion of the shaft, in an assembled state of the shaft and the arm in which the operation portion is arranged between the first flange and the second flange,
    the first flange is arranged closer to the one end than the second flange, and is provided with a cut portion in an outer peripheral edge of the first flange such that the cut portion linearly cuts the first flange along a tangential line of an outer peripheral circle of the shaft portion, and
    the shaft has a structure in which the first flange does not face the operation portion in the shaft direction by the cut portion of the first flange.

2. The selectable one-way clutch according to claim 1, wherein
    one of the shaft and the actuator main body is provided with a groove parallel to the shaft direction, and another one of the shaft and the actuator main body is provided with a protrusion to be fit in the groove.

* * * * *